H. O. SHARP.
OIL GUARD FOR PUMPS, ENGINES, &c.
APPLICATION FILED AUG. 24, 1917.

1,268,502.

Patented June 4, 1918.

Inventor:
Howard O. Sharp
by Heard, Smith & Tennant.
Atty's.

UNITED STATES PATENT OFFICE.

HOWARD O. SHARP, OF TROY, NEW YORK, ASSIGNOR TO WEST SIDE FOUNDRY COMPANY, OF TROY, NEW YORK, A CORPORATION OF NEW YORK.

OIL-GUARD FOR PUMPS, ENGINES, &c.

1,268,502.          Specification of Letters Patent.     Patented June 4, 1918.

Application filed August 24, 1917.  Serial No. 188,042.

*To all whom it may concern:*

Be it known that I, HOWARD O. SHARP, a citizen of the United States, residing at Troy, county of Rensselaer, State of New York, have invented an Improvement in Oil-Guards for Pumps, Engines, &c., of which the following description, in connection with the accompanying drawing, is a specification, like characters on the drawing representing like parts.

This invention has for its object to provide a novel oil guard adapted for use in connection with pumps, engines, etc., that involve in their construction a cylinder having a piston therein which requires to be lubricated. An air pump designed for pumping up the tires of an automobile, or a gasolene engine may be instanced as examples of such pumps or engines.

There are a variety of pumps or engines which are constructed so that the piston is lubricated by the splash system. The splash system of lubrication has the advantage that it requires no particular attention, but on the other hand it has a disadvantage that an excess of lubrication is sometimes produced.

In the case of a pump used for pumping air or gas which it is desired should be relatively free from oil, or in the case of a gasolene engine, the excess lubrication which is apt to result from the splash system of lubrication has deleterious effects. For instance, in the case of a pump for pumping up automobile tires it is desirable that the air which is delivered to the tire should be relatively free from oil, because the presence of oil in the air which is pumped into the tire will deteriorate the inner tube of the tire.

My invention aims to provide a novel oil guard adapted to be used with a pump or engine which is lubricated by the splash system and which will operate to prevent excess oil from the crank case from working by the piston, but will at the same time permit sufficient oil to be delivered to the cylinder to properly lubricate the piston.

While my invention is applicable to pumps of various types and also to engines, yet in order to give an understanding of the invention, I have chosen in the drawing to illustrate it as it might be applied to an air pump. I wish it understood, however, that the invention is not limited in its application to the type of pump herein illustrated.

In the drawings, Figure 1, is a vertical section through a pump embodying my invention on the line 1—1, Fig. 2;

Figure 1:
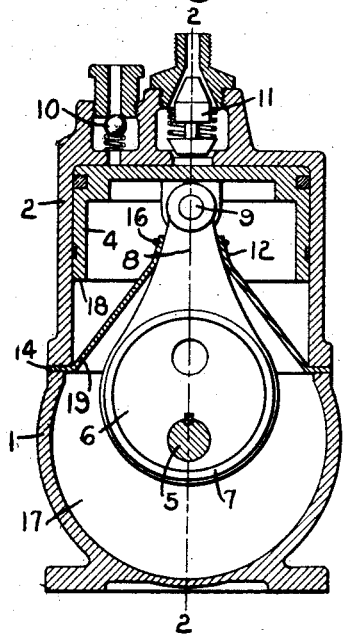
Figure 2:
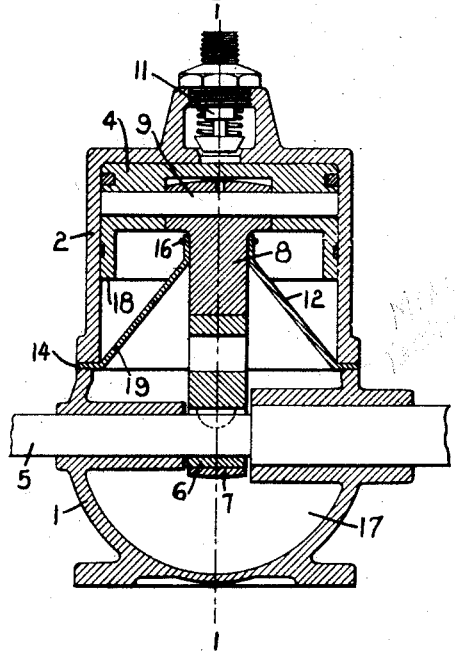
Fig. 2 is a section on the line 2—2, Fig. 1.
Figure 3:
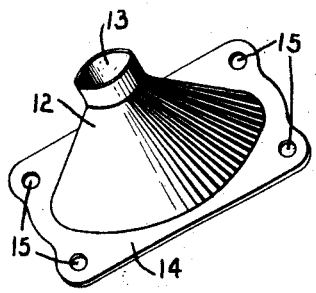
Fig. 3 is a perspective view of the oil guard removed.

My improvements may be applied to various types of pumps. The pump herein shown comprises a base or crank case 1 and a cylinder section 2 which is bolted or secured to the crank case 1 by means of clamping bolts 3. 4 indicates a piston operating in the cylinder, said piston being connected to and actuated from a driving shaft 5 by any suitable means, such as a crank or an eccentric. I have herein shown the driving shaft as having an eccentric 6 thereon which is surrounded by an eccentric strap 7, said strap having the arm or connecting portion 8 which is pivotally connected to the piston at 9. 10 indicates an inwardly-opening check valve controlling the air inlet valve and 11 an outwardly-opening check valve controlling the outlet. The construction thus far described is one which is commonly used in pumps of this nature and forms no part of my present invention. It is necessary, of course, to provide proper lubrication for the piston, connecting rod and eccentric, and this is usually done by placing oil in the base portion 1 so that the pump will be lubricated by the splash system. Where the pump is used for inflating pneumatic tires, it is important that the amount of oil used for lubricating the piston should be sufficient for this purpose, without providing an excess of oil that is likely to work by the piston into the compression end of the pump because the presence of oil in the air which is introduced into the pneumatic tire will have a deleterious effect thereon.

In order to prevent any excess oil from working by the piston I have herein provided an oil guard which is in the nature of a flexible partition having its outer edge secured to the pump casing and being secured centrally to the connecting rod 8. This partition is shown at 12 and it may be made of leather or any other similar flexible material which is more or less porous and will, therefore, permit oil to seep therethrough. The oil guard is cone-shaped and is provided centrally with an aperture 13 through which the connecting rod or eccentric arm 8 extends, said oil guard being tightly secured to said arm 8 so as to make a tight joint therewith. This may conveniently be done by wrapping a binding or clamping wire 16 tightly about the oil guard adjacent the aperture 13. The outer or peripheral edge of the oil guard is fixedly secured to the pump casing. This may conveniently be done by providing the outer edge of the oil guard with the flange portion 14 which is received between the top of the base 1 and the bottom of the cylinder 2, the flange 14 having a shape to correspond to the horizontal cross-sectional shape of the pump casing and cylinder. This flange 14 is provided with apertures 15 through which the clamping bolts 3 extend and said flange thus not only provides means for making a tight connection between the outer edge of the oil guard and the pump casing, but it also acts as a gasket to make a tight joint between the base 1 and the cylinder 2. The oil guard thus forms a partition across the pump between the piston and the eccentric. Since the central portion of the oil guard is fixedly secured to the eccentric arm 8, said central portion will move with the eccentric arm, this movement being freely permitted because the oil guard is of flexible material.

Figure 4:
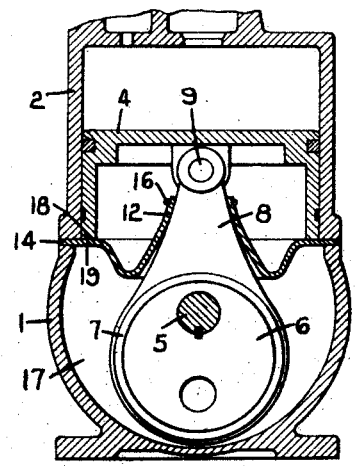
Fig. 4 is a view similar to Fig. 1 showing the piston at the end of its suction stroke.
Figure 5:
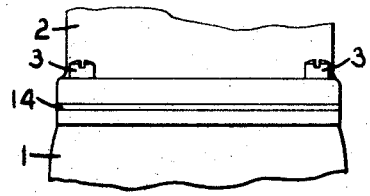
Fig. 5 is a fragmentary view showing the manner of fastening the cylinder section to the crank case 1.

During the operation of the pump, the oil in the eccentric chamber 17 will be splashed against the underside of the oil guard 12 and because of the porous nature of the oil guard it will become saturated with oil and some of the oil will seep therethrough. The construction is such that when the piston is at the end of its suction stroke, the lower edge 18 thereof will be brought into contact with the portion 19 of the oil guard, as shown in Fig. 4, and as the oil guard will be more or less saturated with oil, a certain amount of oil will be picked up by said lower edge 18 of the piston which on the compression stroke will be distributed over the cylinder wall. The piston will thus be sufficiently lubricated, but any excess oil in the cylinder, such as would naturally result from the splash system of lubrication will be prevented and thus all danger of oil working past the piston into the compression chamber of the pump is obviated.

If it is found that the material used for the oil guard 12 has not sufficient porosity to permit a requisite quantity of oil to seep therethrough, said guard may be provided with one or more small apertures which will thus increase its porosity.

While I have herein shown the piston and cylinder constructed to operate as a pump, yet so far as the function and operation of the oil guard 12 is concerned the said piston and cylinder might be that of an engine or of any other apparatus which involves in its construction a cylinder with a piston working therein. Hence I do not wish to be limited to an air pump in the application of the invention, as I consider my invention to relate to the oil guard regardless of the particular device with which it is used.

I claim:

1. The combination with a casing having an eccentric-receiving chamber and a cylinder, of a piston in a cylinder, a shaft, an eccentric thereon operating in said eccentric-receiving chamber and provided with an eccentric arm connected to the piston, and a flexible oil guard of porous material having its peripheral edge secured to the wall of the casing and secured centrally to said connecting arm.

2. In a device of the class described, the combination with a casing provided with an eccentric-receiving chamber and a cylinder, of a piston in the cylinder, a shaft, an eccentric thereon operating in said eccentric-receiving chamber, an eccentric strap encircling said eccentric and having an arm connected to the piston, and an oil guard of porous material connected both to said eccentric arm and the casing and forming a partition across said casing between the piston and the eccentric-receiving chamber.

3. In a device of the class described, the combination with a casing provided with an eccentric-receiving chamber and a cylinder, of a piston in the cylinder, a shaft, an eccentric thereon operating in said eccentric-receiving chamber, an eccentric strap encircling said eccentric and having an arm connected to the piston, and an oil guard of porous material connected both to said eccentric arm and the casing and forming a partition across said casing between the piston and the eccentric-receiving chamber, the point of connection between the oil guard and casing being so situated that at the end of the suction stroke the lower edge of the piston will be brought in contact with the oil guard.

4. In a device of the class described, the combination with a casing having a cylinder, of a piston in the cylinder, a shaft, a connecting rod connecting said piston to said shaft, and a flexible oil guard of porous material having its peripheral edge secured to the wall of the casing and secured centrally to said connecting rod.

5. In a device of the class described, the combination with a casing having a cylinder, of a piston in the cylinder, a shaft, a connecting rod connecting said shaft to said piston, and an oil guard of flexible porous material having its peripheral edge secured to the wall of the casing and provided centrally with an aperture through which the connecting rod extends, and means to secure the central portion of said oil guard to said connecting rod.

In testimony whereof, I have signed my name to this specification.

HOWARD O. SHARP.